(12) United States Patent
Kamel et al.

(10) Patent No.: US 12,508,949 B2
(45) Date of Patent: Dec. 30, 2025

(54) BALANCE CONTROL FOR RECHARGEABLE ENERGY STORAGE SYSTEM

(71) Applicant: GM GLOBAL TECHNOLOGY OPERATIONS LLC, Detroit, MI (US)

(72) Inventors: Mohamed Kamel, Birmingham, MI (US); Chandra S. Namuduri, Troy, MI (US); Suresh Gopalakrishnan, Troy, MI (US); Jun-mo Kang, Ann Arbor, MI (US); Anthony J. Corsetti, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 101 days.

(21) Appl. No.: 18/526,044

(22) Filed: Dec. 1, 2023

(65) Prior Publication Data

US 2025/0178482 A1 Jun. 5, 2025

(51) Int. Cl.
*B60L 58/22* (2019.01)
*B60L 50/60* (2019.01)
*B60L 58/12* (2019.01)
*B60L 58/16* (2019.01)

(52) U.S. Cl.
CPC ............... *B60L 58/22* (2019.02); *B60L 50/60* (2019.02); *B60L 58/12* (2019.02); *B60L 58/16* (2019.02); *B60L 2210/10* (2013.01)

(58) Field of Classification Search
CPC .......... B60L 58/22; B60L 50/60; B60L 58/12; B60L 58/16; B60L 2210/10
See application file for complete search history.

(56) References Cited

U.S. PATENT DOCUMENTS

| | | | |
|---|---|---|---|
| 2018/0134160 A1* | 5/2018 | Kratzer | B60L 58/14 |
| 2020/0055405 A1* | 2/2020 | Duan | H02J 7/0014 |
| 2023/0398903 A1* | 12/2023 | Kamel | B60L 58/18 |
| 2024/0157832 A1* | 5/2024 | Hao | B60L 58/22 |

FOREIGN PATENT DOCUMENTS

DE  102019121918 A1  2/2020

* cited by examiner

*Primary Examiner* — Rexford N Barnie
*Assistant Examiner* — Duc M Pham
(74) *Attorney, Agent, or Firm* — Quinn IP Law

(57) ABSTRACT

Balance control for a rechargeable energy storage system (RESS) having a plurality of power modules. The balance control may include determining a state deviation for each of the power modules and implementing a balance control strategy to individually control power transfer capabilities of the power modules for purposes of driving the state deviation associated therewith toward a state target.

20 Claims, 4 Drawing Sheets

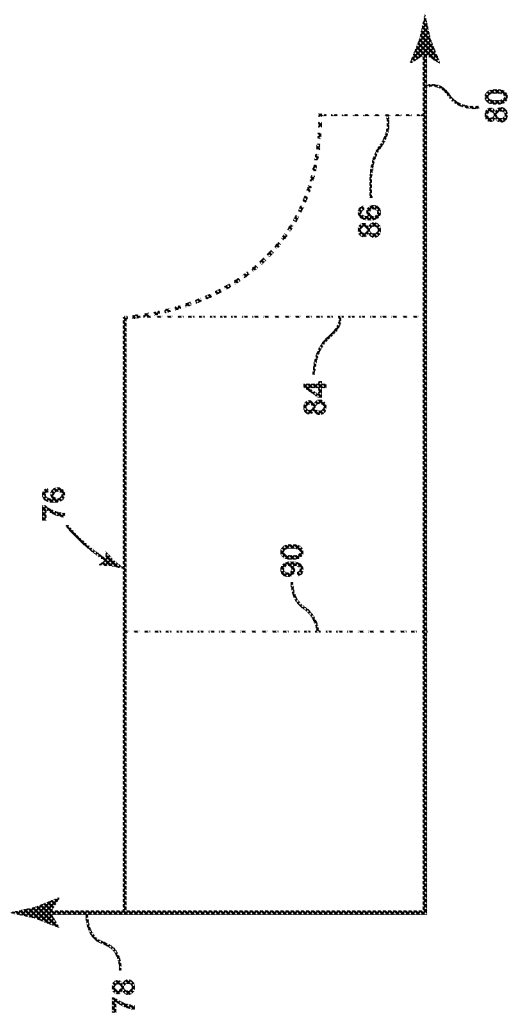

BALANCE CONTROL FOR RECHARGEABLE ENERGY STORAGE SYSTEM

INTRODUCTION

The present disclosure relates to providing balance control for rechargeable energy storage systems (RSS), such as but not necessarily limited to providing balance control for an RESS configured to store and supply electrical power for a traction motor of a vehicle.

A rechargeable energy storage system (RESS) may be configured for storing and supplying electrical power for a wide variety of applications, with one of the more common types of RESSs including a plurality of battery cells arranged into one or more battery modules. Such an RESS may be included onboard a vehicle to store and supply electrical power for a traction motor operable for converting the electrical power to mechanical power for purposes of propelling the vehicle. To achieve and maintain desired levels of performance for the RESS, it may be advantageous to minimize operational differences and imbalances between the battery modules.

SUMMARY

One non-limiting aspect of the present disclosure relates to providing balance control for a rechargeable energy storage system (RESS). The balance control may be advantageous in minimizing operational differences and imbalances between power sources, modules, etc. of the RESS configured for storing and supplying electrical power. The balance control may be used for normalizing, balancing, equalizing, or otherwise adjusting operational differences between the power sources relative a normalized or common target. Accordingly, the present disclosure includes systems and methods for controlling power flow between the power sources, which may include controlling power conversion systems associated therewith according to adjustable current, voltage and/or power limits.

One non-limiting aspect of the present disclosure relates to a method of balancing a plurality of power modules configured for storing and supplying electrical power as part of a rechargeable energy storage system (RESS). The method may include determining a state for each of the power modules, determining a state deviation for each of the power modules for quantifying a deviation of the state of the power module associated therewith relative to a state target, and implementing a balance control strategy to balance the power modules. The balance control strategy may select a maximum current threshold for each of the power modules to individually normalize the state of the power module associated therewith toward the state target.

The method may include implementing the balance control strategy based on the state representing a state of charge (SOC) and the state target representing a SOC target.

The method may include implementing the balance control strategy based on the state representing a voltage and the state target representing a voltage target.

The method may include implementing the balance control strategy based on the state representing a state of health (SOH) and the state target representing a SOH target.

The method may include implementing the balance control strategy based on the state representing a state of energy (SOE) and/or a state of power (SOP) and the state target representing a SOE and/or a SOP target.

The method may include determining a combined output of the power modules while operating according to the balance control strategy to be less than a power demand of the LV bus and implementing a maximum performance strategy in place of the balance control strategy. The maximum performance strategy may permit the power modules to operate above the maximum LV current thresholds set as part of the balance control strategy.

The method may include implementing the balance control strategy in concert with the power modules providing high voltage (HV) electrical power to an electric motor for converting the HV electrical power to mechanical power operable for propelling a vehicle.

The method may include the power modules are connected in series and the RESS includes a plurality of power converters, with an input of each power converter connected in parallel with one of the power modules and an output of each power converter connected together in parallel.

The method may include the power converters as direct current (DC) to DC (DC-DC) converters.

One non-limiting aspect of the present disclosure relates to a method of balancing a plurality of power modules configured for storing and supplying electrical power as part of a rechargeable energy storage system (RESS) included onboard a vehicle. The RESS may be operable for providing high voltage (HV) power to a traction motor and low voltage (LV) power to an LV bus. The method may include determining a state for each of the power modules, determining a state deviation for each of the power modules for quantifying a deviation of the state of the power module associated therewith relative to a state target, and implementing a balance control strategy to balance the power modules. The balance control strategy may individually control power transfer capabilities of the power modules to drive the state deviation associated therewith toward the state target.

The method One non-limiting aspect of the present disclosure relates to the balance control strategy setting a current limit for each of the power modules. The current limits may specify a maximum current output available for the power module associated therewith.

The method may include implementing the balance control strategy based on the state representing a state of charge (SOC) and the state target representing a SOC target.

The method may include setting the current limits for the power modules having the SOC less than the SOC target to be greater than the current limits set for the power modules having the SOC equal to or greater than SOC target.

The method may include overriding the current limits in response to determining a combined power output of the energy modules to be less than a power demand of a load connected to the LV bus.

The method may include the balance control strategy setting a current limit and a voltage limit for each of the power modules.

The method may include setting the current limits in proportion to the state deviation of the power module associated therewith and setting the voltages to each be approximately equal.

One non-limiting aspect of the present disclosure relates to a vehicle. The vehicle may include an electric motor configured for converting high voltage (HV) power to mechanical power suitable for propelling the vehicle, a low voltage (LV) bus operable for distributing LV power for one or more loads onboard the vehicle, and a rechargeable energy storage system (RESS) operable for providing the HV power to the electric motor and the LV power to the LV bus. The RESS may include a plurality of battery cells arranged into a plurality of battery modules, with each of the battery modules connecting together in series and individually in parallel with one of a plurality of power converters operable for controlling LV power transfer between the battery module associated therewith and the LV bus. The vehicle may include a controller operable for controlling the power converters according to a balance control strategy. The balance control strategy may individually control the LV power transfer via each of the power converters to balance the battery modules toward a normalized target.

The controller may be operable for determining a state for each of the power modules, determining a state deviation for the state of each power modules relative to the normalized target, and implementing the balance control strategy to individually control power transfer capabilities of the power modules relative to the state deviation associated therewith.

The balance control strategy may include setting a maximum current threshold individually for each of the power converters and thereafter iteratively adjusting the maximum current thresholds to drive the state deviation of the power module associated therewith toward the normalized target.

The may be operable for determining a combined output of the power converters while operating according to the balance control strategy to be less than a power demand of the LV bus and implementing a maximum performance strategy in place of the balance control strategy for permitting the power modules to operate above the maximum current thresholds set as part of the balance control strategy.

These features and advantages, along with other features and advantages of the present teachings, may be readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which may be incorporated into and constitute a part of this specification, illustrate implementations of the disclosure and together with the description, serve to explain the principles of the disclosure.

FIG. 4 illustrates an operational graph of a power conversion system capabilities in accordance with one non-limiting aspect of the present disclosure.

DETAILED DESCRIPTION

As required, detailed embodiments of the present disclosure may be disclosed herein; however, it may be understood that the disclosed embodiments may be merely exemplary of the disclosure that may be embodied in various and alternative forms. The figures may not be necessarily to scale; some features may be exaggerated or minimized to show details of particular components. Therefore, specific structural and functional details disclosed herein may need not to be interpreted as limiting, but merely as a representative basis for teaching one skilled in the art to variously employ the present disclosure.

Figure 1:
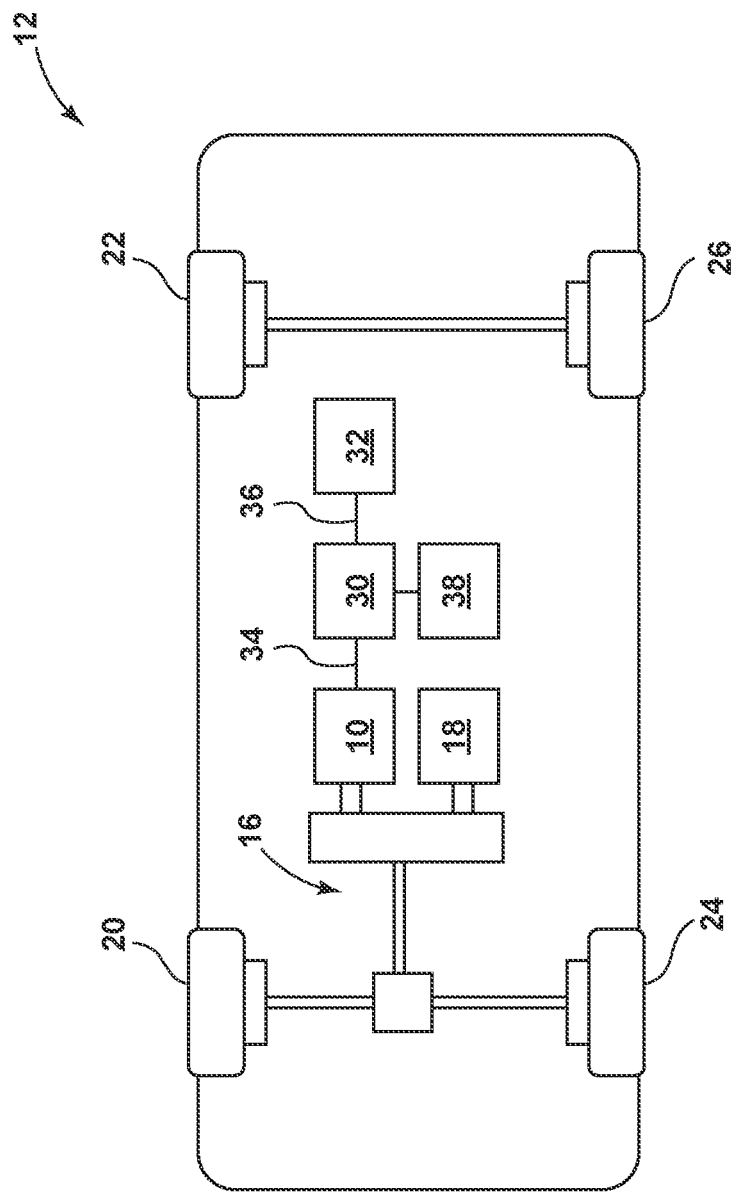
FIG. 1 illustrates a vehicle in accordance with one non-limiting aspect of the present disclosure.

FIG. 1 illustrates a vehicle 12 in accordance with one non-limiting aspect of the present disclosure. The vehicle 12, which may be interchangeable referred to as an electric or hybrid vehicle 12, may include an electric, traction motor 14 operable for converting electrical power to mechanical power for purposes of performing work, such as for mechanically powering a drivetrain 16 to propel the vehicle. The vehicle 12 is illustrated as a hybrid type due to the powertrain 16 optionally including an internal combustion engine (ICE) 18 for generating mechanical power. The powertrain 16 may include componentry to facilitate conveying rotative force from the traction motor 12 to one or more of the wheels 20, 22, 24, 26. The vehicle 10 may include a rechargeable energy storage system (RESS) 30 configured to store and supply electrical power for the traction motor 12 and/or other components, systems, etc. 32 onboard the vehicle 10, such as via a first bus 34 and a second bus 36. The vehicle 10 may include a vehicle controller 38 to facilitate monitoring, controlling, measuring, and otherwise directing operation, performance, etc. onboard the vehicle 10, which may include performing measurements, taking readings, or otherwise collecting data to facilitate providing balance control for the RESS 30.

Figure 2:
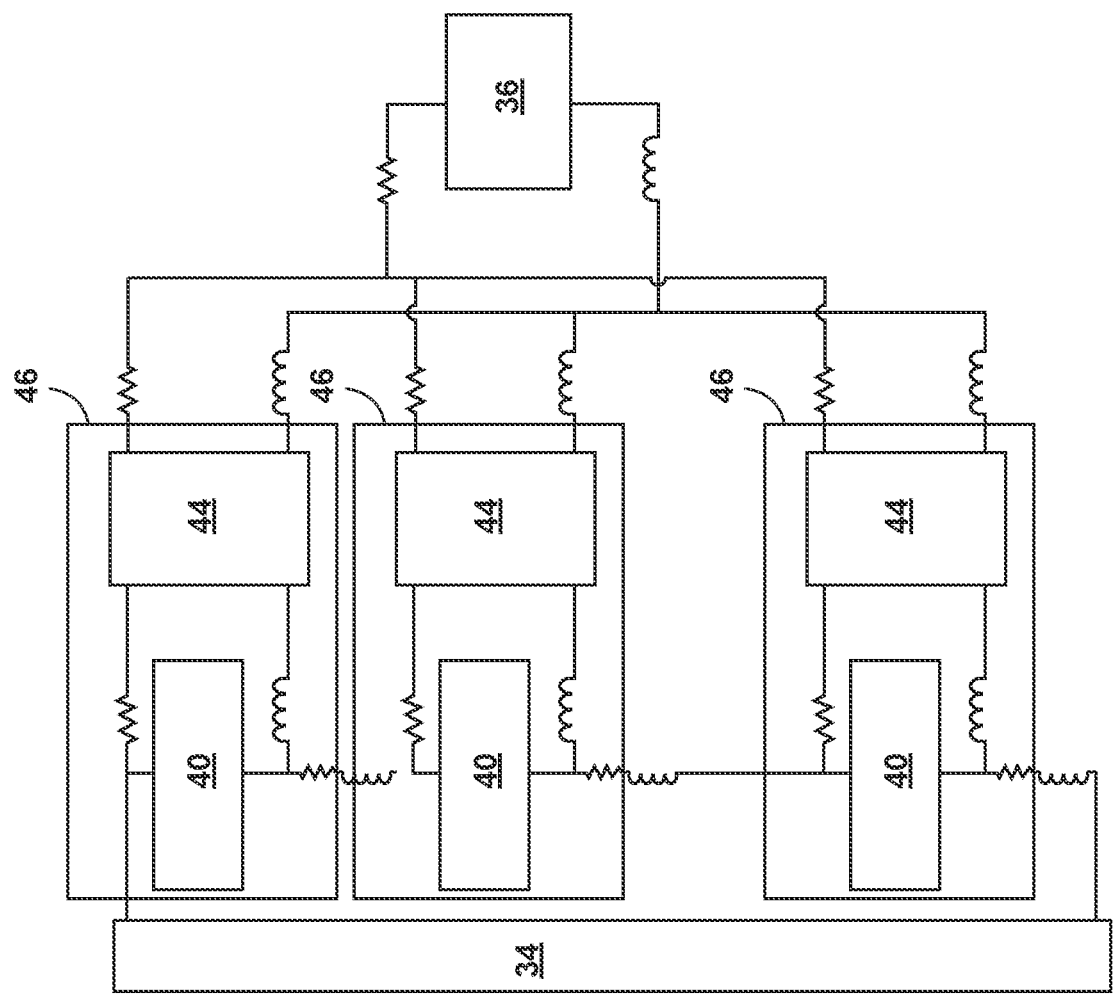
FIG. 2 illustrates a partial schematic view of an RESS in accordance with one non-limiting aspect of the present disclosure.

FIG. 2 illustrates a partial schematic view of the RESS 30 in accordance with one non-limiting aspect of the present disclosure. The RESS 30 may include a plurality of power sources, cells, or other storage units (not shown) arranged into a plurality of power modules, packs, or other groupings 40. The present disclosure contemplates the power modules 40 being comprised of a wide variety of components operable for storing and supplying electrical power. The power modules 40, for example, may include various combinations of battery cells, battery packs, capacitors, supercapacitors, fuel cells, or other types of energy components operable for storing and supplying electrical power. While the present disclosure fully contemplates the balance control being useful in other environments and for other systems, the described use of the balance control with the vehicle 12 may be particularly advantageously in minimizing operational differences and imbalances between the power modules 40 while operating within an environment where the RESS 30 may be regularly subjected to relatively high power demands and long term operating requirements.

The RESS 30 is shown for exemplary purposes as including the power modules 40 connecting together in series such that the series connection may be operable to provide a main or a high voltage (HV) output to the first bus 34, which may be correspondingly referred to as a main or HV bus. The RESS 30 is also shown for exemplary purposes as including the power modules 40 individually connected in parallel with one of a plurality of power converters 44. The power converters 44 may be comprised of power electronics capable of controlling power exchange with the modules 40 associated therewith, optionally with each power converter 44 including an input and an output, which may be interchangeable or reversible. The power converters 44, for example, may be direct current (DC) to DC (DC-DC) converters 44 connected in the illustrated manner such that the inputs connect in parallel with one or more of the modules 40 and the outputs connect together in parallel to provide an auxiliary or a low voltage (LV) output to the second bus, which may be correspondingly referred to as an auxiliary or LV bus. The power modules 40 and the power converters 44 associated therewith may together form individual power 34, 36, i.e., one power conversion system 46 for each power module 40 and power converter 44 combination. The first and second buses 34, 36 are shown to be separate for illustrative purposes as the present disclosure fully contemplates the buses 34, 36 being joined or connected together and/or one bus 34, 36 being used to provide or exchange electrical power with the other bus 34, 36 or additional buses (not shown).

A plurality of circuit representations for resistance (R) and inductance (L) are illustrated to reflect equivalent factors affecting power distribution, i.e., the resistance, impedance, etc. associated with the power conversion systems 46, the power converters 44, the buses 34, 36, and/or the corresponding wires, busbars, traces, etc. connected thereto influencing power transfer. Even when ideally manufactured, the resistances, inductances, etc. associated with each of the power conversion systems 46 may vary somewhat such that even when controlled in the same manner or according to the same operating instructs and parameters, the power conversion systems 46 may individually operate in a marginally different manner, which in some circumstances may result in operational differences and imbalances between the power conversion systems 46. To avoid one or more of the power conversion systems 46 wearing or degrading more quickly than another power conversion system 46, and for a variety of other reasons, it may be beneficial to control the power conversion systems 46 according to the balance control described herein. The balance control may be operable to regulate use of the individual power conversion systems 46 relative to a normalized or desired target.

The controller 38 may be configured to control the power converters 44 to in turn regulate power exchanged with the power conversion systems 46 in a manner that results in overall imbalances and differences between the power conversion systems 46 being minimized or drawn over time closer to the common target. The controller 38, for example, may be configured for individually adjusting current, voltage, and power exchange individually for each of the power conversion systems 46 relative to the other power conversion systems 46, with some power conversion systems 46 potentially being driven differently than some other power conversion systems 46. This ability to individually tailor power transfer on a per power conversion system 46 basis may be useful in managing the load, stress, and other restraints on each power conversion system 46 relative to the other power conversion systems 46 so that overall differences and imbalances between the power conversion systems 46 may be limited and relatively averaged out over time. The controller 38 may be configured to balance the power conversion systems 46 relative to a wide variety of targets, including targets based on current, voltage, power, temperature, state of charge (SOC), state of health (SOH), state of energy (SOE), state of power (SOP), etc.

Figure 3:
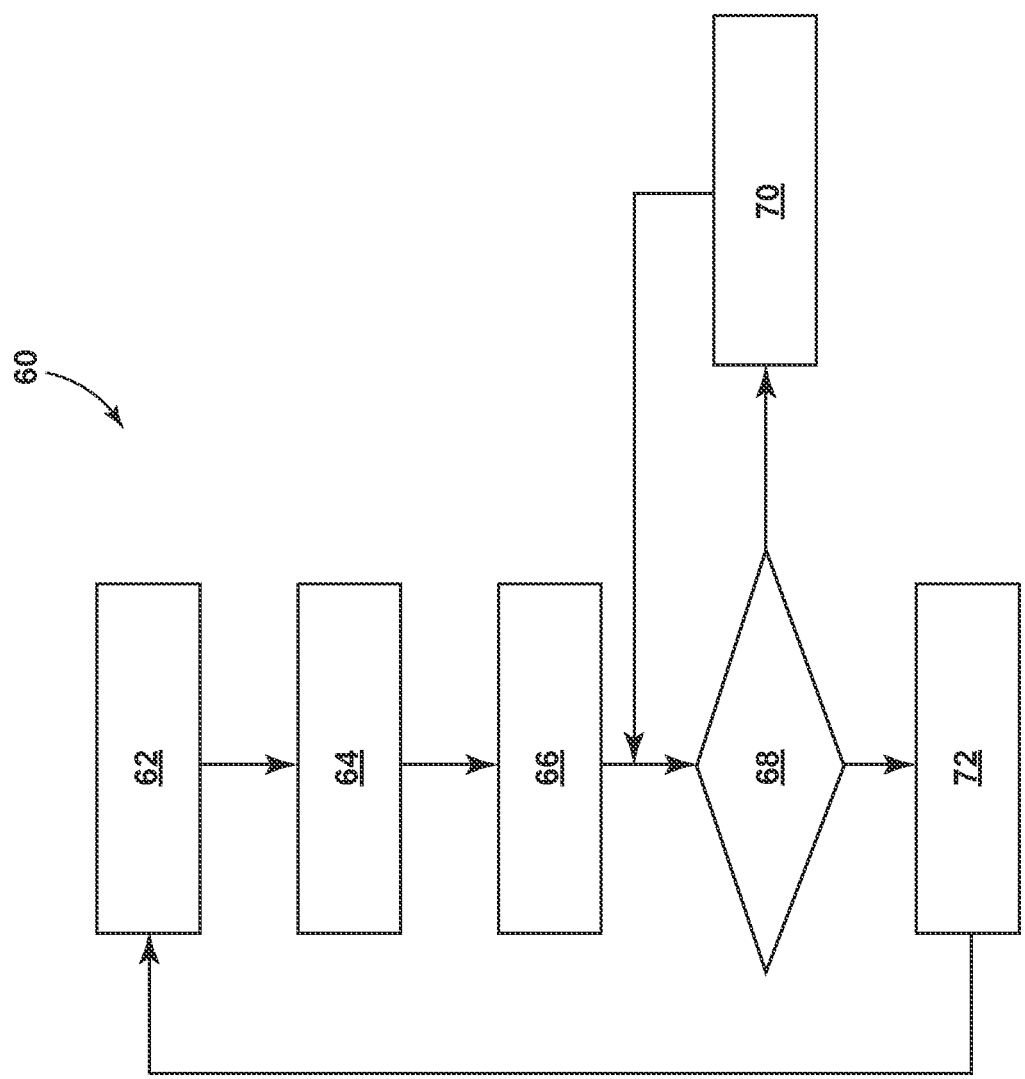
FIG. 3 illustrates a flowchart of a method for balancing the power conversion systems in accordance with one non-limiting aspect of the present disclosure.

FIG. 3 illustrates a flowchart 60 of a method for balancing the power conversion systems 46 in accordance with one non-limiting aspect of the present disclosure. The method may be implemented with the controller 38 and/or other devices onboard and/or offboard the vehicle 12 controlling the RESS 30, and in particular the power converters 44, to implement various control strategies. The controller 38 and/or other devices used in implementing the control strategies may perform calculations, issue instructions, and/or perform other operations according to logic, software, algorithms, etc., which may be based on an associated one or more processors executing a plurality of non-transitory instructions stored on one or more computer-readable storage mediums. While the RESS 30 may be controlled according to other and/or additional strategies without deviating from the scope and contemplation of the present disclosure, the method is predominantly described with respect to controlling the RESS 30 to meet electrical power demands while selectively operating according to a balance control strategy and a maximum performance strategy.

The balance control strategy may generally relate to placing limits or otherwise individually adjusting power transfer capabilities of the power conversion systems 46 so that each of the power conversion systems 46 are collectively driven towards a normalized target. The maximum performance strategy may generally relate to removing the limits or other restraints used to intentionally drive the power conversion systems 46 toward the normalized target such that the power conversion systems 46 may be available to provide power without being metered to maintain balance with each other. Block 62 relates to a targeting process whereby the controller 38 may determine a state normalized target for the power conversion systems 46. The state normalized target may be selected to a benchmark towards which the operation of the power conversion systems 46 may be individually directed so as to provide a collective commonality for the power conversion systems 46. The state normalized target, for example, may be defined relative to one or more targets based on current, voltage, power, temperature, SOC, SOH, SOE, SOP, etc. for the sake of presentation simplicity, the method is predominantly described with respect to defining the normalized state normalized target relative to SOC, which may be referred to as an SOC target. The SOC target may represent a common SOC level desired for each of the power conversion systems 46.

Block 64 relates to a state process whereby the controller 38 may determine a state for each of the power conversion systems 46. The state may include a state value or other metric to relate the power conversion systems 46, or the power modules 40 and/or the power converters 44 independently, to the state normalized target. The state may be representative of present or active measurements, calculations, or other metrics made individually for each of the power conversion systems 46 to quantify operation of the associated power conversion system 46 relative to the state normalized target. Block 66 relates to a deviation process whereby the controller 38 may determine a state deviation for each of the power conversion systems 46. The state deviations may be used for quantifying a deviation of the state of each power conversion system 46 relative to the state target. The state deviation, for example, may be based on mathematical representation suitable for quantifying individual differences between the state of each power conversion system 46 relative to the state normalized target. With respect to the exemplary use of the SOC target, the state deviation determined for each of the power conversion systems 46 may be based on a relative difference between the state of the associated power conversion system 46 and the normalized target, e.g., if the SOC target is a percentage value, such as 70%, the state deviation may be based on subtracting the SOC state value from the state target such that the state deviation may correspond with a percentage value by which the SOC of the corresponding power conversion system 46 deviates from the SOC target.

Block 68 relates to a strategy selection process whereby the controller 38 may determine whether to implement the balance control strategy or the maximum performance strategy for purposes of meeting power demands. While the present disclosure contemplates other thresholds or triggers for switching between the balance control strategy and the maximum performance strategy, the method may differentiate between the strategies depending on power available from the power conversion systems 46. This, for example, may include determining a power threshold based on a power demand of one or more loads connected to the LV bus 36 and/or the HV bus 34 and/or other elements demanding electrical power from the RESS 30 and determining whether the power available from the power conversion systems 46, i.e., the combined output of the power conversion systems 46, may be sufficient to meet the power demand. Block 70 relates to a maximum performance process for implementing the maximum performance strategy when the power available from the power conversion systems 46 is unable to meet the power demand, i.e., when the power available from the RESS 30 is less than the power threshold. Block 72 relates to a balance control process for implementing the balance control strategy when the power available from the power conversion systems 46 is able to meet the power demand, i.e., when the power available from the RESS 30 is greater than the power threshold.

The balance control strategy may correspond with the controller 38 setting limits, restraints, parameters, or other requirements for the power conversion systems 46 for purposes of individually driving the power conversion systems 46 collectively towards the SOC target. One non-limiting aspect of the present disclosure contemplates implementing the balance control strategy by selecting maximum balance current limits for each of the power converters 44. The maximum balance current limits may be used to limit the amount of current may be draw from the power conversion system 46 associated therewith. The maximum balance current limits may be set differently for the power conversion systems 46 depending on the state deviation determined for the power conversion system 46 associated therewith. This, for example, may include setting the maximum balance current limits for the power conversion systems 46 having an SOC above the SOC threshold to a lower maximum balance current limit relative to the power conversion systems 46 having an SOC below the SOC threshold. The maximum balance current limits may be set and thereafter iteratively increased or decreased depending on the SOC of the corresponding power conversion system 46 correspondingly increasing and decreasing relative to the SOC target. Similar restraints may be set for voltage, voltage and current, power, temperature, etc., e.g., a maximum power flow or transfer capabilities for each of the power conversion systems 46 may be set by employing corresponding control of the power converters 44.

The balance control strategy may be used in the noted manner such that some power conversion systems 46 may be permitted to provide more power than other power conversion systems 46, such as to increase the use of certain power conversion systems 46 over the use of other power conversion systems 46. This disparate control of the power conversion systems 46 may be advantageous in adjusting relative operation of the power conversion systems 46 so that each power conversion system 46 may be used more or less depending on the state deviation of the associated power conversion system 46. The power conversion systems 46, however, may have additional limits or maximums on their capabilities, e.g., the power conversion systems 46 may have maximum capabilities or design limits on the amount of current, voltage, and/or power they may be able to provide. FIG. 4 illustrates an operation characteristics graph 76 providing a representation of power conversion system 46 capabilities in accordance with one non-limiting aspect of the present disclosure. The graph 76 may include a vertical axis 78 representing a voltage and a horizontal axis 80 representing a current available from one of the power conversion systems 46.

The graph 76 illustrates capabilities of the power conversion system 46 to distribute power at a maximum voltage decreasing once the current reaches a first current threshold 84 and thereafter continues to decrease until the current reaches a second or maximum current threshold 86. As one skilled in the art may appreciate, the voltage may experience droop or otherwise slope downwardly from left to right, however, the detail is omitted for the sake of presentation simplicity. The balance control strategy may leverage the operating characteristics of the power conversion systems 46 to implement the balance control strategy contemplated herein. This, for example, may include setting the maximum balance current limit, which may be reference a location 90, individually and separately for each of the power conversion systems 46 such that the maximum balance current limit is leftward of the first and/or second current thresholds 84, 86. By setting the balance current limit to values less than the first current threshold, for instance, the power transfer capabilities of the power conversion systems 46 may be metered or restrained relative to the maximum capabilities, optionally with some power conversion systems 46 more restrained than others in order to drive the power converter 44 systems collectively towards the state normalized target.

Returning to FIG. 3, implementation of the balance control strategy may include iteratively returning to Block 62 and repeating the process thereafter for purposes maintaining, increasing, and/or decreasing the maximum balance current limits and/or other restraints placed upon the power conversion systems 46 so as to correspondingly adjust power transfer to account for ongoing changes in the relative operation of the power conversion systems 46 to the state normalized target. It may be advantageous in this manner to perform the iterative adjustments to account for some power modules 40 temporarily providing more less power than other power modules 40 whereafter less restraints may be needed to comport the power conversion systems 46 towards the normalized state normalized threshold. Once differences and/or imbalances between the power conversion systems 46 become minimized or approach the state normalized target, the amount of restraints placed upon the power conversion system 46 may be reduced.

As shown in Block 70, in the event the restraints placed upon the power conversion systems 46 may be unable to meet the power demand, the maximum performance strategy may be implemented. The maximum performance strategy may correspond with removing the maximum balance current limits or other restraints placed upon the power conversion systems 46 so that the power conversion systems 46 may maximally operate in an attempt to meet the power demand. The maximum performance strategy, for example, may correspond with controlling the power conversion systems 46 according to the characteristics shown in the graphs above. In the event the power demand decreases or the power conversion systems 46 otherwise are able to provide power above the power threshold specified in Block 68, the balance control strategy may be re-implemented in Block 72. The foregoing predominately described adjusting current limits for the power conversion systems 46 in proportion to the state deviation determined therefor, however, other calculations may be performed to determine how much each of the power conversion systems 46 is to be limited in an effort to commonly or equally balance the RESS 30. One such methodology may include determining a maximum value signal for an output voltage across at least one power conversion system 46 or the at least one load and metering that power conversion relative to lower output power conversion systems 46.

In one aspect, the controller 38 may derive control signals used for implementing the balance control strategy according to a threshold ($\Delta$), where the at least one transmitted signal can have at least one value when the threshold ($\Delta$) is greater than or equal to zero, and the at least one transmitted signal has at least another value when the threshold ($\Delta$) is lower than zero. In another aspect, the transmitted value may a maximum balance current limit when the threshold ($\Delta$) is greater than or equal to zero or the transmitted value is a minimum current limit when the threshold ($\Delta$) is less than zero. In another aspect, controls signals corresponding to at least one power conversion system 46 according to a ratio between at least one battery state and a function in all battery states, i.e., $SOC_i/(SOC_1+SOC_2+ \ldots SOC_N)$ such that the normalized battery state is the maximum battery state, i.e., $\Delta SOC_i = SOC_i/\max(SOC)$, the minimum battery state, i.e., $\Delta SOC_i = SOC_i/\min(SOC)$, or the average battery state, i.e., $\Delta SOC_i = SOC_i/\text{mean}(SOC)$. In another aspect, controller 38 may use a low pass filter (moving average) or hysteresis logic to prevent chattering in individual converter 44 current limits determined according to the threshold ($\Delta$). In another aspect, the controller 38 may utilize at least one proportional (P) or proportional integral (PI), or proportional integral with derivative gain (PID) compensators or advanced arithmetic controllers such as model predictive controllers (MPC) or neural networks to derive the at least one communication signal to the at least one power conversion system 46. In another aspect, the power conversion systems 46 may optionally ignore the current limit or power limit signal if the measured voltage across the DC/DC converter 44 output drops below a certain threshold and opt to utilize the current or power limit signal if the voltage exceeds a certain threshold.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method of balancing a plurality of power modules configured for storing and supplying electrical power as part of a rechargeable energy storage system (RESS), the method comprising:
    determining a state for each of the power modules;
    determining a state deviation for each of the power modules to quantify a deviation of the state of each respective power module relative to a state target;
    implementing a balance control strategy to balance the power modules, the balance control strategy including selection of a maximum current threshold for each of the power modules to individually normalize the state of each respective power module toward the state target;
    determining a combined output of the power modules while operating according to the balance control strategy to be less than a power demand of a low voltage (LV) bus; and
    implementing a maximum performance strategy in place of the balance control strategy, the maximum performance strategy permitting the power modules to operate above the maximum current thresholds set as part of the balance control strategy.

2. The method according to claim 1, further comprising:
    implementing the balance control strategy based on the state representing a state of charge (SOC) and the state target representing a SOC target.

3. The method according to claim 1, further comprising:
    implementing the balance control strategy based on the state representing a voltage and the state target representing a voltage target.

4. The method according to claim 1, further comprising:
    implementing the balance control strategy based on the state representing a state of health (SOH) and the state target representing a SOH target.

5. The method according to claim 1, further comprising:
    implementing the balance control strategy based on the state representing a state of energy (SOE) and/or a state of power (SOP) and the state target representing a SOE and/or a SOP target.

6. The method according to claim 1, further comprising:
    implementing the balance control strategy in concert with the power modules providing high voltage (HV) electrical power to an electric motor, the electric motor converting the HV electrical power to mechanical power operable for propelling a vehicle.

7. The method according to claim 6, wherein:
    the power modules are connected in series; and
    the RESS includes a plurality of power converters, with an input of each power converter connected in parallel with one of the power modules and an output of each power converter connected together in parallel.

8. The method according to claim 7, wherein:
    the power converters are direct current (DC) to DC (DC-DC) converters.

9. A method of balancing a plurality of power modules configured for storing and supplying electrical power as part of a rechargeable energy storage system (RESS) included onboard a vehicle, the RESS operable for providing high voltage (HV) power to a traction motor and low voltage (LV) power to an LV bus, the method comprising:
    determining a state for each of the power modules;
    determining a state deviation for each of the power modules to quantify a deviation of the state of each respective power module relative to a state target;
    implementing a balance control strategy to balance the power modules, the balance control strategy individually controlling power transfer capabilities of the power modules to drive each respective state deviation toward the state target, wherein the balance control strategy setting a current limit for each of the power modules, the current limits specifying a maximum current output available for the power module associated therewith;

implementing the balance control strategy based on the state representing a state of charge (SOC) and the state target representing a SOC target; and setting the current limits for the power modules having the SOC less than the SOC target to be greater than the current limits set for the power modules having the SOC equal to or greater than SOC target.

10. The method according to claim 9, further comprising:
overriding the current limits in response to determining a combined power output of the power modules to be less than a power demand of a load connected to the LV bus.

11. The method according to claim 9, further comprising:
the balance control strategy setting a current limit and a voltage limit for each of the power modules.

12. The method according to claim 11, further comprising:
setting the current limits in proportion to the state deviation of the power module associated therewith; and
setting the voltage limits to each be approximately equal.

13. A vehicle, comprising:
an electric motor configured for converting high voltage (HV) power to mechanical power suitable for use in propelling the vehicle;
a low voltage (LV) bus operable for distributing LV power for one or more loads onboard the vehicle;
a rechargeable energy storage system (RESS) operable for providing the HV power to the electric motor and the LV power to the LV bus, the RESS including a plurality of battery cells arranged into a plurality of battery modules, wherein each of the battery modules collectively connect together in series and individually in parallel with one of a plurality of power converters, wherein the power converters are operable for controlling LV power transfer between the battery module associated therewith and the LV bus; and
a controller operable for:
controlling the power converters according to a balance control strategy, the balance control strategy individually controlling the LV power transfer of the power converters to balance the battery modules toward a normalized target;
determining a state for each of the battery modules;
determining a state deviation for the states of each respective battery modules relative to the normalized target;
implementing the balance control strategy to individually control power transfer capabilities of the battery modules relative to each respective state deviation, wherein the balance control strategy includes setting a maximum current threshold individually for each of the power converters and thereafter iteratively adjusting the maximum current thresholds to drive the state deviation of the battery module associated therewith toward the normalized target;
determining a combined output of the power converters while operating according to the balance control strategy to be less than a power demand of the LV bus; and
implementing a maximum performance strategy in place of the balance control strategy, the maximum performance strategy permitting the battery modules to operate above the maximum current thresholds set as part of the balance control strategy.

14. The vehicle according to claim 13, wherein the controller is operable for:
implementing the balance control strategy based on the state representing a state of charge (SOC) and the normalized target representing a SOC target.

15. The vehicle according to claim 13, wherein the controller is operable for:
implementing the balance control strategy based on the state representing a voltage and the normalized target representing a voltage target.

16. The vehicle according to claim 13, wherein the controller is operable for:
implementing the balance control strategy based on the state representing a state of health (SOH) and the normalized target representing a SOH target.

17. The vehicle according to claim 13, wherein the controller is operable for:
implementing the balance control strategy based on the state representing a state of energy (SOE) and/or a state of power (SOP) and the normalized target representing a SOE and/or a SOP target.

18. The vehicle according to claim 13, wherein the controller is operable for:
implementing the balance control strategy in concert with the plurality of battery modules providing high voltage (HV) electrical power to the electric motor, the electric motor converting the HV electrical power to mechanical power operable for propelling a vehicle.

19. The vehicle according to claim 18, wherein:
the battery modules are connected in series; and
the RESS includes a plurality of power converters, with an input of each power converter connected in parallel with one of the battery modules and an output of each power converter connected together in parallel.

20. The vehicle according to claim 19, wherein:
the power converters are direct current (DC) to DC (DC-DC) converters.

* * * * *